United States Patent
Lin et al.

(10) Patent No.: US 9,179,435 B2
(45) Date of Patent: *Nov. 3, 2015

(54) FILTERING AND CLUSTERING CROWD-SOURCED DATA FOR DETERMINING BEACON POSITIONS

(71) Applicant: Microsoft Corporation, Redmond, WA (US)

(72) Inventors: Jyh-Han Lin, Mercer Island, WA (US); Sindhura Bandhakavi, Redmond, WA (US); Pradipta Kumar Basu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/061,560

(22) Filed: Oct. 23, 2013

(65) Prior Publication Data

US 2014/0057651 A1 Feb. 27, 2014

Related U.S. Application Data

(63) Continuation of application No. 13/185,520, filed on Jul. 19, 2011, now Pat. No. 8,577,389, which is a continuation-in-part of application No. 13/008,034, filed on Jan. 18, 2011, now Pat. No. 8,542,637.

(51) Int. Cl.
*H04W 64/00* (2009.01)
*H04W 24/10* (2009.01)

(52) U.S. Cl.
CPC ............ *H04W 64/003* (2013.01); *H04W 24/10* (2013.01)

(58) Field of Classification Search
None
See application file for complete search history.

(56) References Cited

U.S. PATENT DOCUMENTS

| 6,704,301 | B2* | 3/2004 | Chari et al. ................... 370/351 |
| 6,763,224 | B2* | 7/2004 | Davies et al. ................ 455/41.2 |
| 7,184,421 | B1  | 2/2007 | Liu et al. |
| 7,492,736 | B2* | 2/2009 | Ho ................................. 370/329 |
| 7,787,437 | B2* | 8/2010 | Sakoda ......................... 370/350 |
| 2006/0095348 | A1 | 5/2006 | Jones et al. |

(Continued)

OTHER PUBLICATIONS

Ramalingam, et al., "Associativity based cluster formation and cluster management in ad hoc networks", Retrieved at <<http://www.hipc.org/hipc2002/2002Posters/adhoc_cluster.pdf>>, Mar. 29, 2002, 5 pages.

(Continued)

*Primary Examiner* — Hassan Kizou
*Assistant Examiner* — Hashim Bhatti
(74) *Attorney, Agent, or Firm* — Aneesh Mehta; Kate Drakos; Micky Minhas (57) ABSTRACT

Embodiments analyze crowd-sourced data to identify a moved or moving beacon. The crowd-sourced data involving a particular beacon is filtered based on a cluster start time associated with the beacon. A clustering analysis groups the filtered crowd-sourced data for the beacon into a plurality of clusters based on spatial distance. Timestamps associated with the crowd-sourced data in the clusters are compared to select one of the clusters. The crowd-sourced data associated with the selected cluster is used to determine position information for the moved beacon. The cluster start time for the beacon is adjusted based on the earliest timestamp associated with the positioned observations corresponding to the selected cluster. Adjusting the cluster start time removes from a subsequent analysis the positioned observations associated with one or more prior positions of the beacon.

20 Claims, 8 Drawing Sheets

(56) References Cited

U.S. PATENT DOCUMENTS

| | | | |
|---|---|---|---|
| 2008/0280624 A1 | 11/2008 | Wrappe | |
| 2009/0224909 A1 | 9/2009 | Derrick et al. | |
| 2009/0232056 A1 | 9/2009 | Doi et al. | |
| 2010/0254345 A1 | 10/2010 | Raravi et al. | |
| 2011/0047463 A1* | 2/2011 | Shepherd et al. | 715/723 |
| 2011/0306357 A1* | 12/2011 | Alizadeh-Shabdiz et al. | 455/456.1 |
| 2012/0182933 A1* | 7/2012 | Bandhakavi et al. | 370/328 |
| 2012/0184292 A1* | 7/2012 | Lin et al. | 455/456.1 |

OTHER PUBLICATIONS

Jing, et al., "Global Control Plane Architecture for Cognitive Radio Networks", Retrieved at <<http://www.winlab.rutgers.edu/~xjing/CogNetsICC07jing.pdf>>, Jun. 2007, 5 pages.

Eagle, et al., "Methodologies for Continuous Cellular Tower Data Analysis", Retrieved at <<http://realitycommons.media.mit.edu/pdfs/pervasive09.pdf>>, Seventh International Conference on Pervasive Computing, May 2009, 13 pages.

Kuo, et al., "The Beacon Movement Detection Problem in Wireless Sensor Networks for Localization Applications", Retrieved at <<http://people.cs.nctu.edu.tw/~yctseng/papers.pub/sensor16-beacon-movement-ieee-tmc.pdf>>, IEEE Transactions on Mobile Computing, vol. 08, Issue 10, Oct. 2009, 13 pages.

Kuo, et al., "Detecting Movement of Beacons in Location-Tracking Wireless Sensor Networks", Retrieved at <<http://ieeexplore.ieee.org/stamp/stamp.jsp?tp=&arnumber=4349737>>, IEEE 66th Vehicular Technology Conference, Sep. 2007, 5 pages.

Non Final Office Action in U.S. Appl. No. 13/008,034, Mailed Date: Nov. 8, 2012, filed Jan. 18, 2011, 9 pages.

Final Office Action in U.S. Appl. No. 13/008,034, Mailed Date: Feb. 13, 2013, filed Jan. 18, 2011, 13 pages.

Notice of Allowance in U.S. Appl. No. 13/008,034, Mailed Date: May 24, 2013, filed Jan. 18, 2011, 8 pages.

"Filtering and Clustering Crowd-Sourced Data for Determining Beacon Positions", U.S. Appl. No. 13/185,520, filed Jul. 19, 2011, 37 pages.

Notice of Allowance in U.S. Appl. No. 13/185520, Mailed Date: Jul. 2, 2013, filed Jul. 19, 2011, 8 pages.

\* cited by examiner

FILTERING AND CLUSTERING CROWD-SOURCED DATA FOR DETERMINING BEACON POSITIONS

CROSS-REFERENCE TO RELATED APPLICATION

This application is a continuation of U.S. application Ser. No. 13/185,520, filed Jul. 19, 2011, which is a continuation-in-part of U.S. application Ser. No. 13/008,034, filed Jan. 18, 2011, the entirety of which are hereby incorporated by reference herein.

BACKGROUND

Some existing location services rely on crowd-sourced data to deliver location information to requesting computing devices such as mobile telephones. The existing systems, however, assume that all the beacons are stationary. In practice, some of the beacons may move or be moving, which may result in multiple probable locations for the beacon. Some existing location services attempt to identify the multiple probable locations for the beacon by performing a clustering analysis on the crowd-sourced data. The clustering analyses, however, become very complicated (e.g., time consuming and computationally intensive) for beacons that have moved more than once.

SUMMARY

Embodiments of the disclosure apply a clustering analysis to a subset of positioned observations selected based on a cluster start time to determine a position of a moved beacon. A computing device selects one or more positioned observations from a plurality of positioned observations for a beacon. Each of the selected positioned observations has a timestamp associated therewith that is later than or equal to a cluster start time associated with the beacon. The computing device groups the selected positioned observations for the beacon into a plurality of clusters based on spatial distance. One of the plurality of clusters is selected based on the timestamps associated with the positioned observations corresponding to the clusters. A position is calculated for the beacon based on the positioned observations corresponding to the selected cluster. The cluster start time for the beacon is adjusted based on the earliest timestamp associated with the positioned observations corresponding to the selected cluster to remove from subsequent consideration the positioned observations associated with one or more prior positions of the beacon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure successively filter and process positioned observations 204 to simplify a clustering analysis to determine a current position of a beacon 104 that has moved multiple times. In particular, a cluster start time 308 (or re-birth timer) is associated with beacons 104 that have moved. The cluster start time 308 is used to render obsolete, or otherwise exclude, the positioned observations 204 involving the beacon 104 when the beacon 104 was in a prior position.

The clustering analysis clusters beacon positioned observations 204 based on distance and time to identify beacons that have moved or are moving. In some embodiments, a k-means clustering algorithm using spatial geographic distance as the partition dimension identifies logical clusters each having a set of the positioned observations 204. In general, the radii of the individual clusters are smaller than the radius of a single cluster involving all the positioned observations 204. Further, the distance between the clusters is larger than the radii of each cluster.

Based on timestamps associated with the positioned observations 204 in the clusters, identifying beacons that have moved or moving enables more accurate position location information to be calculated by eliminating outdated positioned observations 204 from the calculation. In some embodiments, clusters having mutually exclusive sets of positioned observations 204 indicate that the beacon has moved. For example, all the observed dates in one cluster precede the observed dates in the other cluster. In contrast, clusters having positioned observations 204 with overlapping dates indicate that the beacon is a moving beacon (e.g., Internet access on public transportation).

By selecting a subset of the positioned observations 204 to use as input to the clustering analysis, aspects of the disclosure simplify the clustering analysis (e.g., reduce the clustering analysis to a two-clustering analysis).

Figure 1:
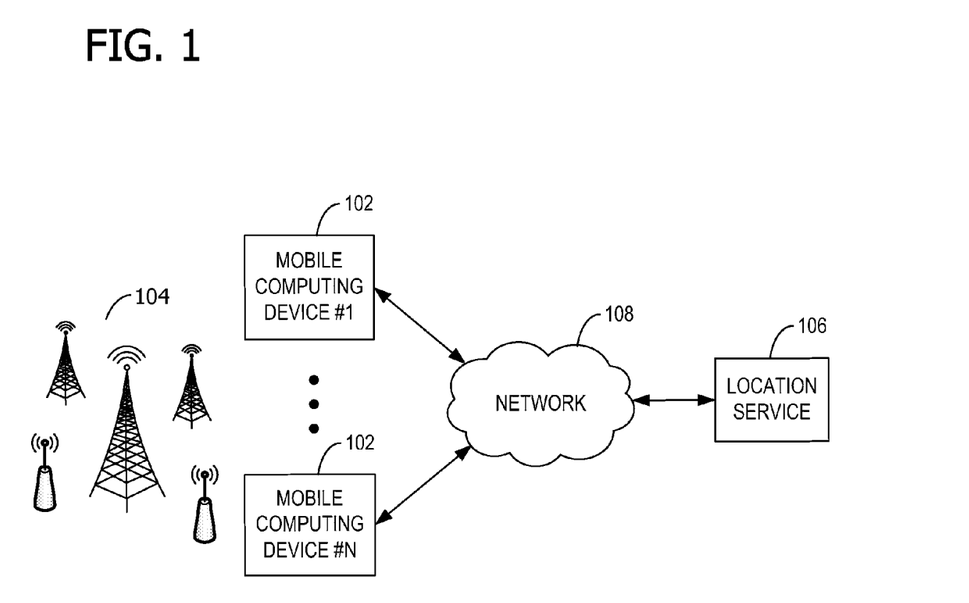
FIG. 1 is an exemplary block diagram illustrating a plurality of mobile computing devices providing crowd-sourced data to a cloud-based location service.

Referring next to FIG. 1, an exemplary block diagram illustrates a plurality of mobile computing devices 102 providing crowd-sourced data to a cloud-based location service 106. The plurality of mobile computing devices 102 include, for example, mobile computing device #1 through mobile computing device #N. In some embodiments, the mobile computing devices 102 include a mobile telephone, laptop, netbook, gaming device, and/or portable media player. The mobile computing devices 102 may also include less portable devices such as desktop personal computers, kiosks, and tabletop devices. Additionally, each of the mobile computing devices 102 may represent a group of processing units or other computing devices.

The mobile computing devices 102 observe or otherwise detect one or more beacons 104 or other cell sites. The beacons 104 represent network elements for connecting the mobile computing devices 102 to other computing devices and/or network elements. Exemplary beacons 104 include cellular towers, base stations, base transceiver stations, base station sites, and/or any other network elements supporting any quantity and type of communication modes. Aspects of the disclosure are operable with any beacon 104 supporting any quantity and type of wireless and/or wired communication modes including cellular division multiple access (CDMA), Global System for Mobile Communication (GSM), wireless fidelity (WiFi), 4G/Wi-Max, and the like.

Each of the mobile computing devices 102 stores properties or dimensions for each observed beacon 104. In some embodiments, exemplary properties include a latitude and longitude of the observing mobile computing device (or other description of the location of the mobile computing device), and an observation time. Other exemplary properties are contemplated, however. For example, other exemplary properties include a signal strength, an access point name (APN), and a destination device to which the mobile computing device 102 is connected or attempting to connect.

When the observations are collected, a first observed time and a last observed time across the collected observations are identified as described below. The first observed time and the last observed time represent the earliest time and the most recent time, respectively, that the mobile computing devices 102 observed the particular beacon 104. Each mobile computing device 102, however, sends only one observation time associated with observation of the beacon 104.

The mobile computing devices 102 send the properties as positioned observations 204 to the location service 106 via a network 108. The network 108 includes any means for communication between the mobile computing devices 102 and the location service 106.

While described in the context of the location service 106 receiving and processing the observations, aspects of the disclosure contemplate other entities that receive and/or process the positioned observations 204. The entities include, for example, a cloud-based service, a server, and/or a peer device. The functionality of the location service 106, as described herein, may also be divided among one or more entities. For example, one entity may collect the positioned observations 204 into a storage area for subsequent processing by the location service 106. The positioned observations 204 may be processed as they are received (e.g., in real time), or may be stored for future processing (e.g., as a batch). In the example of FIG. 1, the location service 106 performs the functionality next described with reference to FIG. 2.

Figure 2:
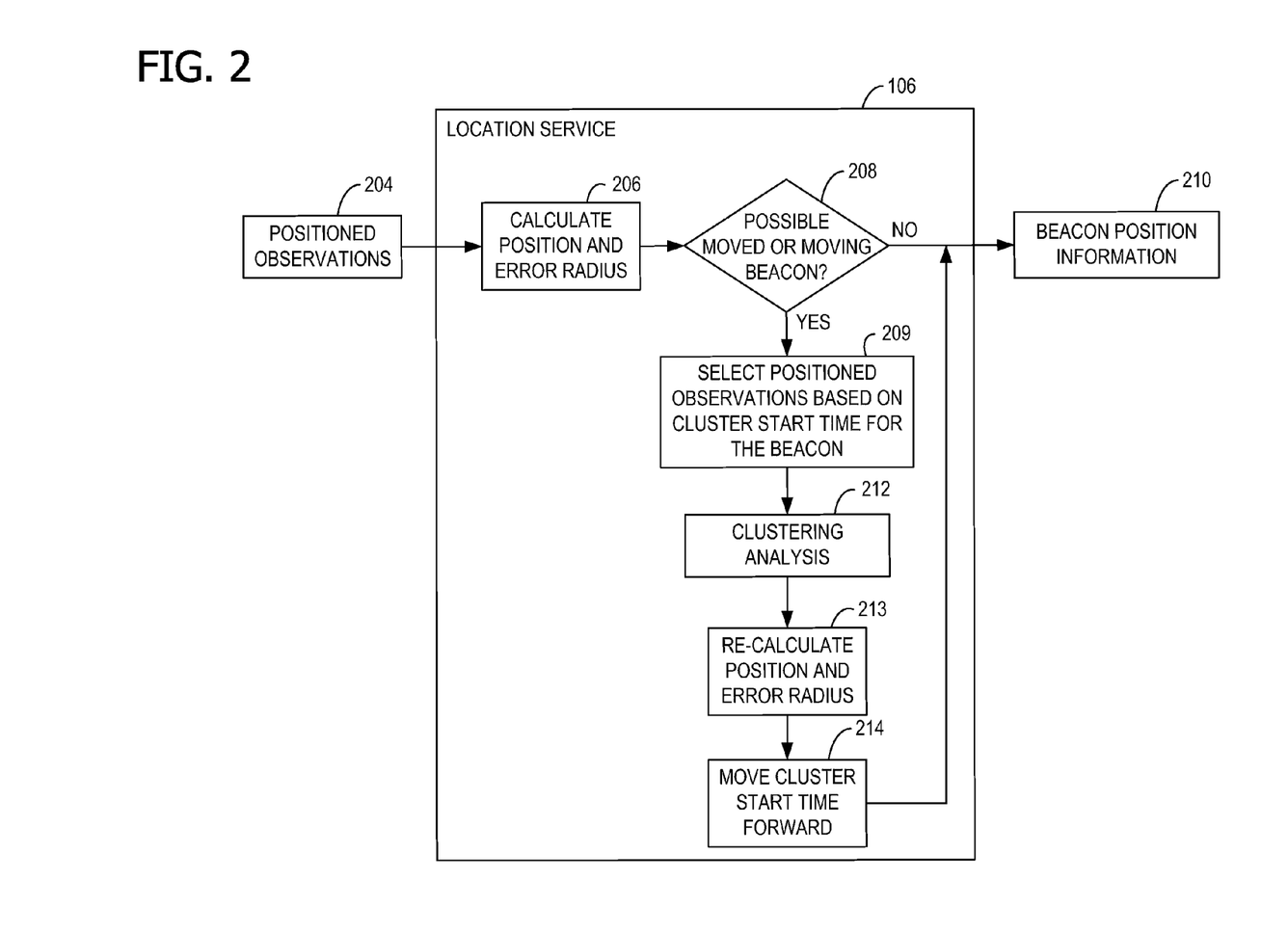
FIG. 2 is an exemplary block diagram illustrating operation of the location service to calculate beacon position information.

Referring next to FIG. 2, an exemplary block diagram illustrates operation of the location service 106 to calculate beacon position information. The location service 106 receives the positioned observations 204. In some embodiments, receiving the positioned observations 204 includes receiving, from a mobile computing device 102, a location of the mobile computing device 102 along with a set of beacons 104 observed by the mobile computing device 102. The location and set of beacons 104 may constitute a record representing crowd-sourced data obtained by the mobile computing device 102.

The location service 106 calculates a position and associated error radius for each observed beacon 104 at 206 using the positioned observations involving that beacon 104. In some embodiments, the error radius represents a range for the beacon 104. The error radius may be dependent on various factors such as beacon type and/or signal strength. The error radius may correspond to, for example, a radius of a circle or other shape (regular or irregular) representing a coverage area for the beacon 104.

Figure 5:
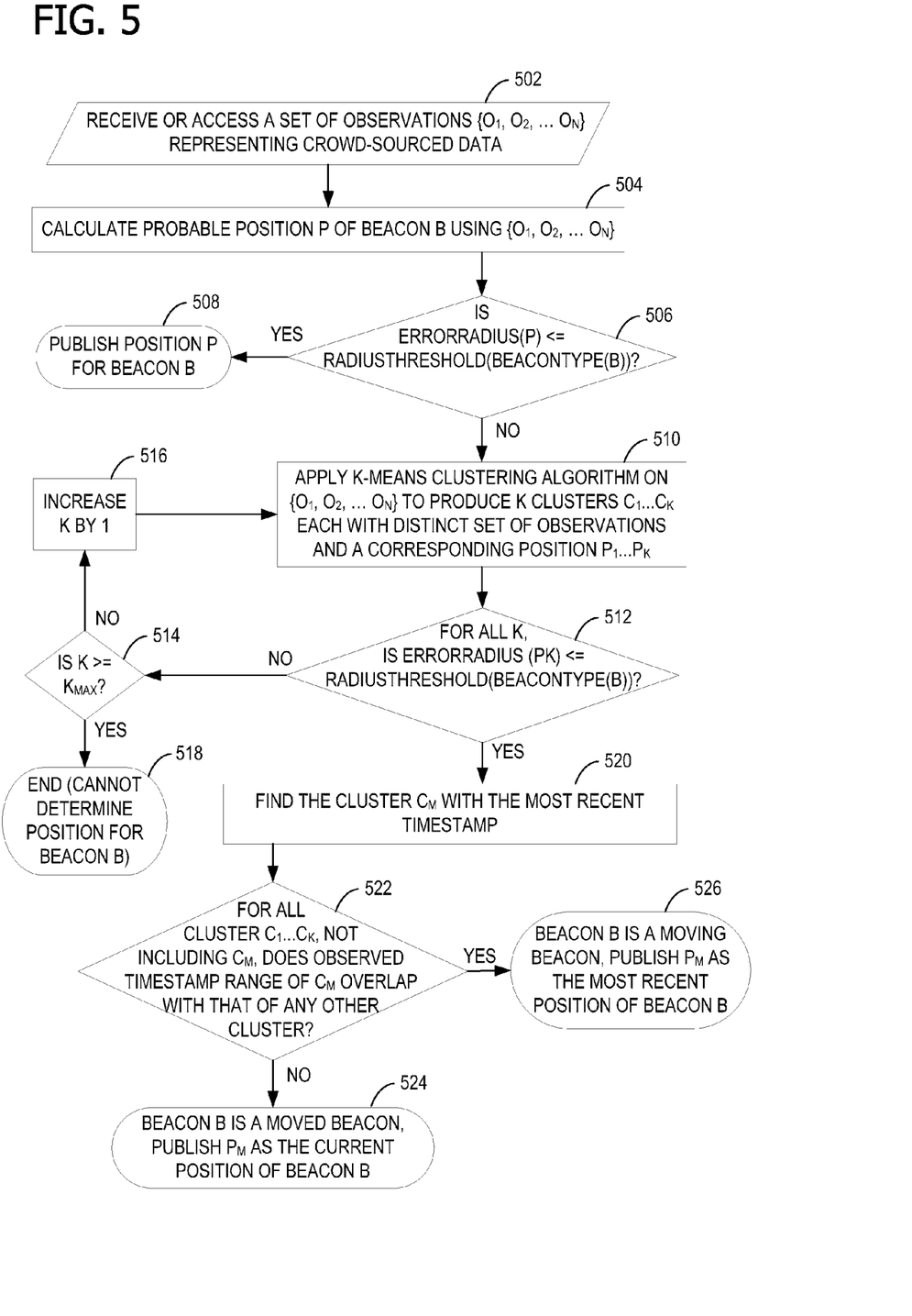
FIG. 5 is an exemplary flow chart illustrating the identification of a beacon as a moved beacon or a moving beacon using a k-means clustering algorithm.

Based on the calculated position and error radius, the location service 106 may conclude that the beacon 104 is possibly a moved beacon or a moving beacon at 208 (e.g., see FIG. 5). If the location service 106 makes such a conclusion, the location service 106 selects positioned observations 204 involving the beacon 104 based on the cluster start times 308. For example, the location service 106 selects only the positioned observations 204 that observed the beacon 104 and have a timestamp 310 on or after the cluster start time 308. A clustering analysis is performed at 212, and the position and error radius are re-calculated at 213.

The cluster start time 308 is adjusted based on the results of the clustering analysis. For example, the location service 106 may move the cluster start time 308 for the beacon 104 forward at 214 (e.g., to the earliest time associated with observation of the beacon 104 at its current or new location, as described below).

At 210, the re-calculated position and error radius are output as beacon position information.

In the example of FIG. 2, the location service 106 outputs the beacon position information. In other examples, the location service 106 may output other determinations such as whether the beacon 104 has moved, whether the beacon 104 should be considered a moving beacon, a set of possible locations for the beacon 104, and the subset of the positioned observations 204 used in the clustering analysis.

Figure 3:
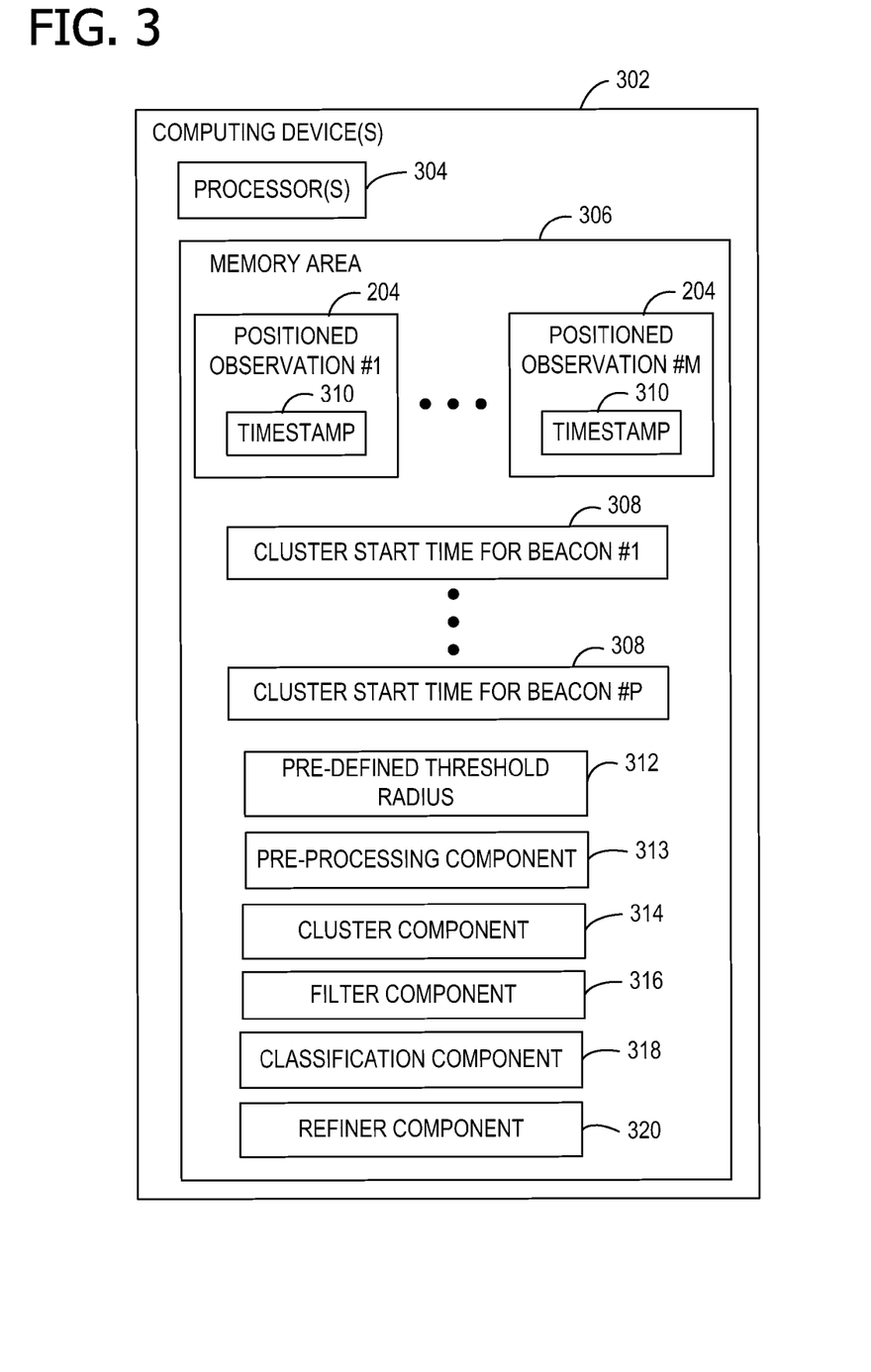
FIG. 3 is an exemplary block diagram illustrating a computing device with computer-executable components for determining the position of a beacon using a clustering analysis.

Referring next to FIG. 3, an exemplary block diagram illustrates one or more computing devices 302 with computer-executable components for determining the position of a beacon 104 using a clustering analysis. In some embodiments, the computing devices 302 represent a cloud-based location determination system such as location service 106 involving a group of processing units or other computing devices. In general, the computing device 302 represents any device executing instructions (e.g., as application programs, operating system functionality, or both) to implement the operations and functionality associated with the computing device 302.

The computing device 302 has at least one processor 304 and a memory area 306. The processor 304 includes any quantity of processing units, and is programmed to execute computer-executable instructions for implementing aspects of the disclosure. The instructions may be performed by the processor 304 or by multiple processors executing within the computing device 302, or performed by a processor external to the computing device 302. In some embodiments, the processor 304 is programmed to execute instructions such as those illustrated in the figures (e.g., FIG. 4 and FIG. 5).

The computing device 302 further has one or more computer-readable media such as the memory area 306. The memory area 306 includes any quantity of media associated with or accessible by the computing device 302. The memory area 306 may be internal to the computing device 302 (as shown in FIG. 3), external to the computing device 302 (not shown), or both (not shown).

The memory area 306 stores, among other data, a plurality of the positioned observations 204 such as positioned observation #1 through positioned observation #M. Each of the positioned observations 204 represents detection by a computing device (e.g., mobile computing device) of at least one beacon 104 at a particular time. Each of the positioned observations 204 includes a timestamp representing the time of observation of the beacon 104 by the mobile computing device 102.

In some embodiments, the computing device 302 includes a network interface card and/or computer-executable instructions (e.g., a driver) for operating the network interface card to receive the positioned observations 204. In other embodiments (not shown), the positioned observations 204 are stored separate in a storage area from the computing device 302. In such embodiments, the computing device 302 accesses the storage area to process the positioned observations 204.

The memory area 306 also stores the cluster start time 308 for each of the beacons 104 included in at least one of the positioned observations 204. In some embodiments, cluster start times 308 are only associated with beacons 104 that have moved. In other embodiments, cluster start times 308 are associated with each of the beacons 104. Exemplary cluster start times 308 include a cluster start time for beacon #1 through a cluster start time for beacon #P. The cluster start time 308 may also be referred to as a re-birth timer or a threshold time. As described herein, positioned observations 204 that include the beacon 104 and have a timestamp 310 on or after the cluster start time 308 are included in a clustering analysis. Similarly, positioned observations 204 that include the beacon 104 and have a timestamp 310 preceding the cluster start time 308 are excluded from the clustering analysis.

The memory area 306 further stores at least one pre-defined threshold radius 312. The pre-defined threshold radius 312 is used to determine whether a calculated error radius is too large (e.g., see FIG. 5).

The memory area 306 further stores one or more computer-executable components. Exemplary components include a pre-processing component 313, a cluster component 314, a filter component 316, a classification component 318, and a refiner component 320. Operation of the computer-executable components is described next with reference to FIG. 4.

Figure 4:
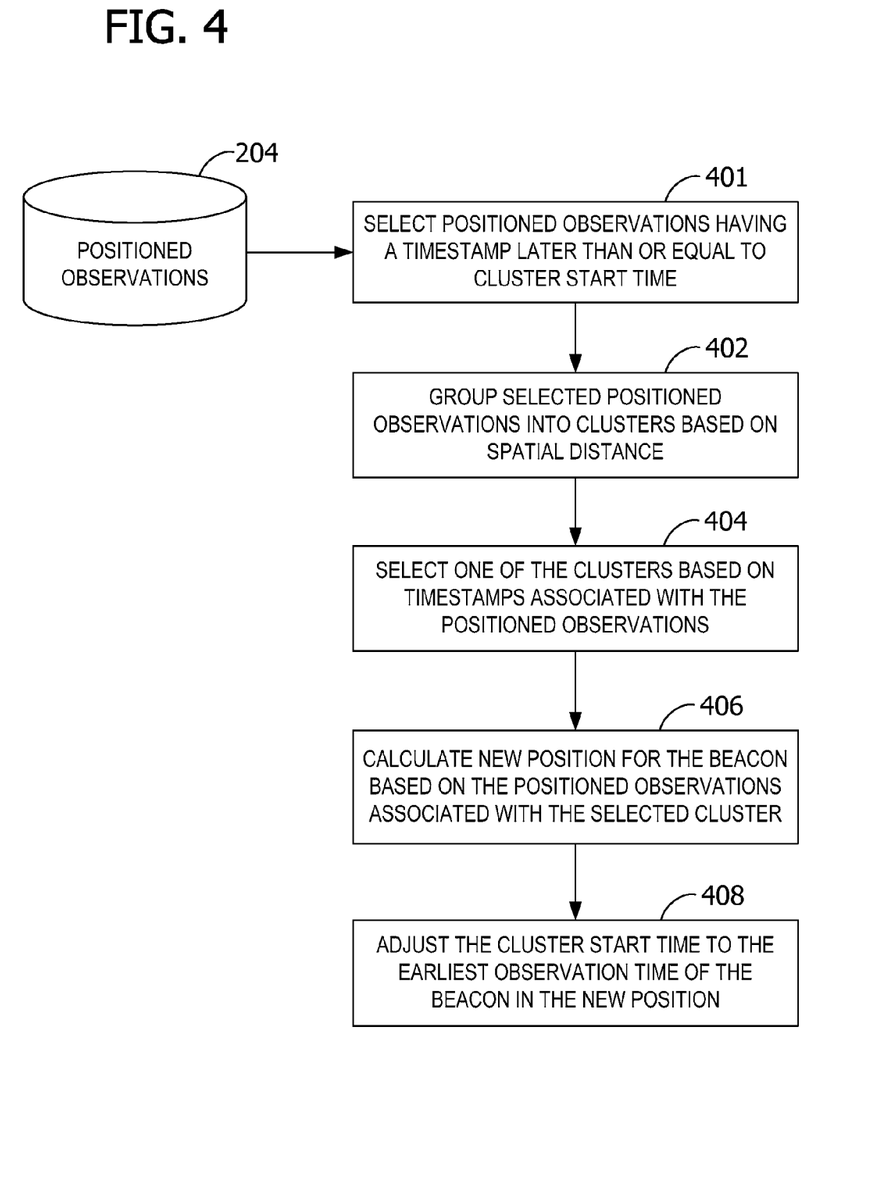
FIG. 4 is an exemplary flow chart illustrating operation of the computing device to group the positioned observations into clusters for determining beacon position information.

Referring next to FIG. 4, an exemplary flow chart illustrates operation of the computing device 302 to group the positioned observations 204 into clusters for determining beacon position information. The operations illustrated in FIG. 4 are performed when the computing device 302 concludes that the beacon 104 has not been stationary. For example, the beacon 104 may have moved, or is moving. In some embodiments, the computing device 302 filters the positioned observations 204 to obtain a set of positioned observations 204 where each of the positioned observations 204 in the set includes the beacon 104 of interest. The computing device 302 calculates a position and error radius for the beacon 104 using location determination algorithms with the set of positioned observations 204 as input. The error radius is compared to a pre-defined threshold radius 312, where the pre-defined threshold radius 312 is based on factors such as, but not limited to, the type of beacon 104 and/or historical data. For example, the pre-defined threshold radius 312 for a WiFi beacon may be 500 meters, while the pre-defined threshold radius 312 for a GSM beacon may be 10 kilometers.

If the error radius does not violate the pre-defined threshold radius 312 (e.g., is less than the pre-defined threshold radius 312), the computing device 302 outputs the calculated position and error radius as the beacon position information and does not perform the operations illustrated in FIG. 4. If the error radius violates the pre-defined threshold radius 312 (e.g., exceeds the pre-defined threshold radius 312), the computing device 302 performs the operations in FIG. 4 as next described to calculated a revised position for the beacon 104.

The computing device 302 (e.g., a cloud-based service) accesses or receives the positioned observations 204 for one of the beacons 104. In some embodiments, the computing device 302 filters or otherwise searches the positioned observations 204 to obtain the positioned observations 204 relating to a particular beacon 104 of interest.

At 401, the computing device 302 selects one or more of the positioned observations 204 for the beacon 104 of interest thereby creating a subset of the positioned observations 204. For example, the computing device 302 selects only the positioned observations 204 having a timestamp 310 on or after the cluster start time 308 associated with the beacon 104 of interest. As a result, each of the selected positioned observations 204 in the subset of the positioned observations 204 has a timestamp 310 associated therewith that is later than or equal to the cluster start time 308 associated with the beacon 104. Selecting the positioned observations 204 may include the computing device 302 explicitly identifying the positioned observations 204 having a timestamp 310 earlier than the cluster start time 308. In other embodiments, the positioned observations 204 having a timestamp 310 earlier than the cluster start time 308 are identified by another entity (e.g., a third party cloud service).

At 402, the computing device 302 groups the selected positioned observations 204 for the beacon 104 into a plurality of clusters based on spatial distance. In some embodiments, the computing device 302 performs a k-means clustering analysis using spatial distance as the partition dimension. For example, the spatial distance is the error radius of beacon position information determined for each cluster during execution of the k-means algorithm. Execution of an exemplary k-means algorithm is described below with reference to FIG. 5. Aspects of the disclosure are operable, however, with any k-means algorithm or algorithm derived therefrom as known in the art.

Each of the clusters determined at 402 have properties including, for example, one or more of the following: a beacon identifier, a cluster number, a determined location and error radius of the beacon 104 using the positioned observations 204 associated with the cluster, a maximum time stamp associated with the positioned observations 204 associated with the cluster, and a minimum time stamp associated with the positioned observations 204 associated with the cluster. Aspects of the disclosure are operable, however, with additional or fewer properties.

At 404, the computing device 302 selects one of the clusters based on the timestamps associated with each of the grouped positioned observations 204. In some embodiments, the timestamps associated with the positioned observations 204 for one of the clusters is compared with the timestamps associated with the positioned observations 204 for another cluster. For example, the cluster having positioned observations 204 with the most recent timestamps is selected.

Based on the timestamp comparisons, aspects of the disclosure can determine if the beacon 104 is a "moved beacon." For example, if the timestamps associated with the positioned observations 204 in a first cluster are mutually exclusive to the timestamps associated with the positioned observations 204 in a second cluster (or the rest of the clusters), then the computing device 302 concludes that the beacon 104 has moved (e.g., between the first and second clusters). In this example, the cluster having positioned observations 204 with the most recent timestamps indicates the current position of the beacon 104, and is hence selected.

Aspects of the disclosure may also determine if the beacon 104 is a "moving beacon." For example, if the computing device 302 concludes that more than one cluster exists yet the timestamps associated with the positioned observations 204 for the clusters are not mutually exclusive (e.g., there is overlap between the positioned observations 204 for the clusters in time), then the computing device 302 concludes that the beacon 104 is moving. In this example, the cluster having positioned observations 204 with the most recent timestamps indicates the current position of the beacon 104, and is hence selected.

At 406, the computing device 302 calculates a position for the beacon 104 based on the positioned observations 204 corresponding to the selected cluster (e.g., the new position of the beacon). At 408, the computing device 302 adjusts the cluster start time 308 for the beacon 104 to the earliest timestamp 310 associated with the positioned observations 204 corresponding to the selected cluster. Aspects of the disclosure contemplate a configurable amount of tolerance regarding adjustment of the cluster start time 308 (e.g., +/−10%) based on, for example, the particular clustering analysis performed and/or empirical observation of performance of the operations in FIG. 4. When the computing device 302 re-performs the operations illustrated in FIG. 4 (e.g., the next day), the positioned observations 204 having a timestamp 310 earlier than the adjusted cluster start time 308 are excluded from the clustering analysis because of the comparison between the adjusted cluster start time 308 and the timestamps 310. In this manner, the computing device 302 effectively removes, from subsequent consideration, the positioned observations 204 associated with one or more prior positions of the beacon 104.

Alternatively or in addition to adjusting the cluster start time 308 and the selecting (e.g., filtering) the positioned observations 204 based on a subsequent comparison between timestamps 310 and the adjusted cluster start time 308, the computing device 302 may remove the positioned observations 204 associated with the prior positions of the beacon 104 from a subsequent clustering analysis by deleting these positioned observations 204 from the memory area 306 or other storage area, by identifying these positioned observations 204 as being associated with a prior position of the beacon 104 (e.g., setting or unsetting a flag associated with each of the positioned observations 204), and/or by moving these positioned observations 204 from one portion of the memory area 306 to another portion of the memory area 306. As such, the computing device 302 limits subsequent analysis to only the positioned observations 204 having a timestamp 310 later than the cluster start time 308.

In some embodiments, the computer-executable components illustrated in FIG. 3 perform the operations, or portions thereof, illustrated in FIG. 4. The pre-processing component 313, when executed by the processor 304, causes the processor 304 to select one or more of the positioned observations 204 from the plurality of positioned observations 204 for the beacon 104 of interest. Each of the selected positioned observations 204 has a timestamp 310 associated therewith that is later than or equal to the cluster start time 308 associated with the beacon 104.

The cluster component 314, when executed by the processor 304, causes the processor 304 to group the positioned observations 204 selected by the pre-processing component 313 into the plurality of clusters based on spatial distance (e.g., the error radius). For example, the cluster component 314 groups the selected positioned observations 204 into two clusters. Each of the two clusters has an initial observation time based on the earliest timestamp 310 associated with the positioned observations 204 involving the beacons 104 in the clusters.

The filter component 316, when executed by the processor 304, causes the processor 304 to analyze the timestamps associated with the positioned observations 204 corresponding to the clusters from the cluster component 314 to determine whether the timestamps associated with each cluster overlap with timestamps associated with any of the other clusters. The classification component 318, when executed by the processor 304, causes the processor 304 to define the beacon 104 as a moved beacon or a moving beacon based on the comparison performed by the filter component 316.

The refiner component 320, when executed by the processor 304, causes the processor 304 to calculate a position for the beacon 104 based on the positioned observations 204 corresponding to the cluster having the later initial observation time.

The pre-processing component 313 also adjusts the cluster start time 308 for the beacon 104 based on the earliest timestamp 310 associated with the positioned observations 204 corresponding to the cluster having the later initial observation time. As described above, this is one of a plurality of ways contemplated by aspects of the disclosure for removing, from subsequent consideration, the positioned observations 204 associated with a prior position of the beacon 104.

In some embodiments, the pre-processing component 313, the cluster component 314, the filter component 316, the classification component 318, and the refiner component 320 are executed iteratively or otherwise repeatedly (e.g., daily) by a cloud-based service. The components may be executed, however, at any interval (e.g., every couple of hours, every couple of days, once a week, once a month, etc).

Referring next to FIG. 5, an exemplary flow chart illustrates the identification of a beacon 104 as a moved beacon or a moving beacon using a k-means clustering algorithm. Each of the mobile computing devices 102 creates a record identifying a beacon 104 observed by the mobile computing device 102 while the mobile computing device 102 is at a particular location at a particular time. For example, each record $\mathbb{R}_{b_i, t_j}$ includes the following fields:

$b_i$ : beacon identifier (e.g. WiFi media access control address, mobile country code, mobile operator code, location area code, and/or cell identifier)

$t_j$: timestamp (e.g. in coordinated universal time) location ( $\mathbb{R}_{b_i, t_j}$): the location of the mobile computing device 102 (e.g., as planetary coordinates including a latitude and longitude as determined by a global positioning system, or a signature of location such as a list of cellular towers)

The records may include more or less information. For example, the timestamp may be expanded to include a first observed time (e.g., the earliest observed time) and a last observed time (e.g., the most recent observed time). The records are collected from the plurality of mobile computing devices 102 and processed to create a set of observations representing the crowd-sourced data. For example, the mobile computing devices 102 send the records to a server such as computing device 302. The server, or another computing device separate from the server, may create the set of observations. In some embodiments, each of the observations has the following factors, properties, or dimensions: a latitude and longitude (of the observing mobile computing device), first observed time, and last observed time.

At 502, the server receives or accesses the set of observations relating to a beacon B. At 504, the server calculates the probable position of the beacon B using the set of observations. The server calculates the probable position of the beacon B based on the crowd-sourced data using a location determination algorithm such as known in the art. The output of the location determination algorithm is a probable position P that, in some embodiments, includes the following factor, properties, or dimensions: latitude and longitude (of the beacon B), an error radius, a first observed time and a last observed time. For example, the location determination algorithm computes position $P_{b_i}$ based on all records $\mathbb{R}_{b_i, t_j}$ for beacon i. In some embodiments, the position $P_{b_i}$ is composed of the following fields:

- $b_i$ : beacon identifier (e.g. WiFi media access control address, mobile country code, mobile operator code, location area code, and/or cell identifier)
- location($P_{b_i}$): location of the beacon (e.g. as planetary coordinates including a latitude and longitude)
- radius($P_{b_i}$): radius of the beacon The server compares the determined error radius with the pre-defined threshold radius 312. In the example of FIG. 5, the pre-defined threshold radius 312 is a function of beacon type. As such, the pre-defined threshold radius 312 is obtained by the function call RadiusThreshold(BeaconType (B)). If the error radius is less than a pre-defined threshold radius 312 at 506, then the server publishes P as the position for beacon B at 508. If the error radius is greater than the pre-defined threshold radius 312 at 506, the server applies a k-means clustering algorithm on the set of observations at 510. For example, if radius($P_{b_i}$)>$R_{b_i}$, where $R_{b_i}$ is the pre-defined threshold radius 312 for the beacon type associated with beacon B, the server considers the beacon to be either a moved beacon or a moving beacon. As such, the beacon B is a candidate for clustering.

The k-means clustering algorithm produces a set of K clusters each having a position and a set of observations. The k-means algorithm starts with K=2 and the geographic distance between each observation position (e.g., latitude and longitude) and the cluster centroid as the dimension. For example, the server applies the k-means clustering algorithm on all record $\mathbb{R}_{b_i, t_j}$ for beacon i to compute the clusters $\mathbb{C}_{l, b_i}$ for beacon i. In some embodiments, each cluster $\mathbb{C}_{l, b_i}$ is composed of the following fields:

- $b_i$: beacon identifier (e.g. WiFi media access control address, mobile country code, mobile operator code, location area code, and/or cell identifier)
- l: the cluster number
- location($\mathbb{C}_{l, b_i}$): location of the beacon (e.g. as planetary coordinates including a latitude and longitude)
- radius($\mathbb{C}_{l, b_i}$): radius of the beacon
- $t_{max, l}$: the maximum time stamp of all $\mathbb{R}_{b_i, t_j}$ in $\mathbb{C}_{l, b_i}$
- $t_{min, l}$: the minimum time stamp of all $\mathbb{R}_{b_i, t_j}$ in $\mathbb{C}_{l, b_i}$ If the error radius for any of the clusters is greater than the pre-defined threshold radius 312 at 512, then K is increased by one at 516 (so long as K is not greater than or equal to the maximum value at 514). If K is greater than or equal to the maximum value for K at 514, then the process ends at 518 as an accurate position for beacon B cannot be determined For example, radius($\mathbb{C}_{l, b_i}$)>$R_{b_i}$ means that all records $\mathbb{R}_{b_i, t_j}$ for beacon i do not form k clusters, and k should be increased by one. Operations 510, 512, 514, and 516 are repeated until all records $\mathbb{R}_{b_i, t_j}$ for beacon i form k clusters (e.g., either radius($\mathbb{C}_{l, b_i}$)≤$R_k$ or k<$k_{max}$).

If the error radius for each cluster is less than or equal to pre-defined threshold radius 312 at 512, the server selects the cluster with the most recent timestamp at 520. For example, the server finds the $\mathbb{C}_{l, b_i}$ that has the maximum $t_{max, l}$.

The server proceeds to examine the timestamps associated with each of the clusters to determine whether any overlap exists in time (e.g., whether K cohesive clusters were formed). For example, the server compares the timestamp range of the selected cluster with the timestamp ranges of the other clusters. If there is no overlap at 522, the server concludes that beacon B is a moved beacon at 524. The server publishes the position of the selected cluster as the current position of beacon B. If there is overlap in the timestamp ranges at 522, the server concludes that beacon B is a moving beacon at 526. The server publishes the position of the selected cluster as the most recent position of beacon B.

For example, suppose the selected cluster number is m. The server compares $t_{min,m}$ with all $t_{max, l}$ where l<>m. If $t_{max, i}$−$t_{min, m}$≤$T_{overlap}$, where $T_{overlap}$ is a predefined parameter, the server publishes location($\mathbb{C}_{m, b_i}$) as the location for beacon $b_i$. Otherwise, the server considers the beacon to be a moving beacon.

Figure 6:
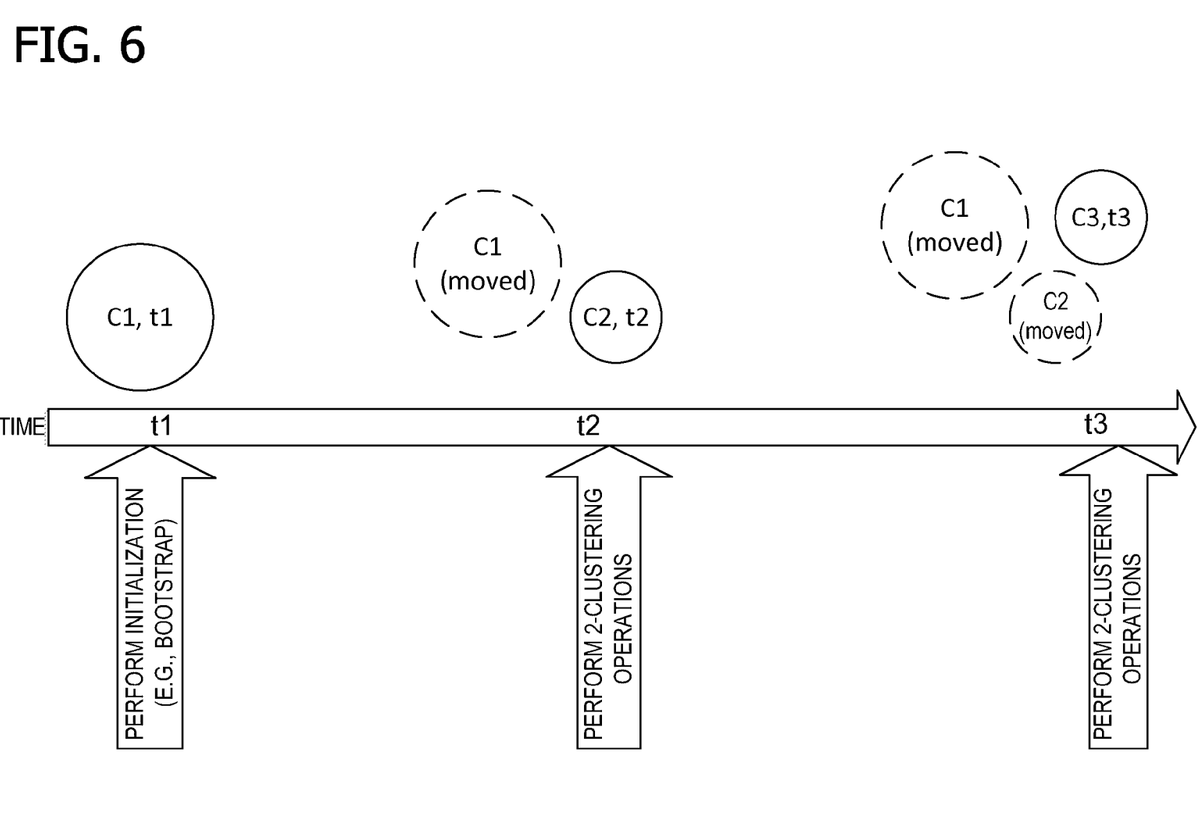
FIG. 6 is an exemplary block diagram illustrating three moved beacon locations and earliest observation times for each of the locations.

Referring next to FIG. 6, an exemplary block diagram illustrates three moved beacon locations and earliest observation times for each of the locations. Locations C1, C2, and C3 represent different, successive locations of the beacon 104 over time. Times t1, t2, and t3 represent times of the earliest positioned observations 204 captured for the beacon 104 at each of the three locations C1, C2, and C3, respectively. In the example of FIG. 6, initialization or bootstrap operations are performed on or about time t1 to identify current location C1 for the beacon 104.

The operations described and illustrated with reference to FIG. 4 and FIG. 5 are performed periodically over time to determine whether the current location of the beacon 104 has changed. For example, after positioned observations 204 begin to be received around time t2, two-clustering operations are performed to determine that the beacon 104 has moved from location C1 to location C2. Similarly, after positioned observations 204 begin to be received around time t3, the two-clustering operations are performed to determine that the beacon 104 has moved from location C2 to location C3.

Execution of the initialization or bootstrap operations is next described.

Figure 7:
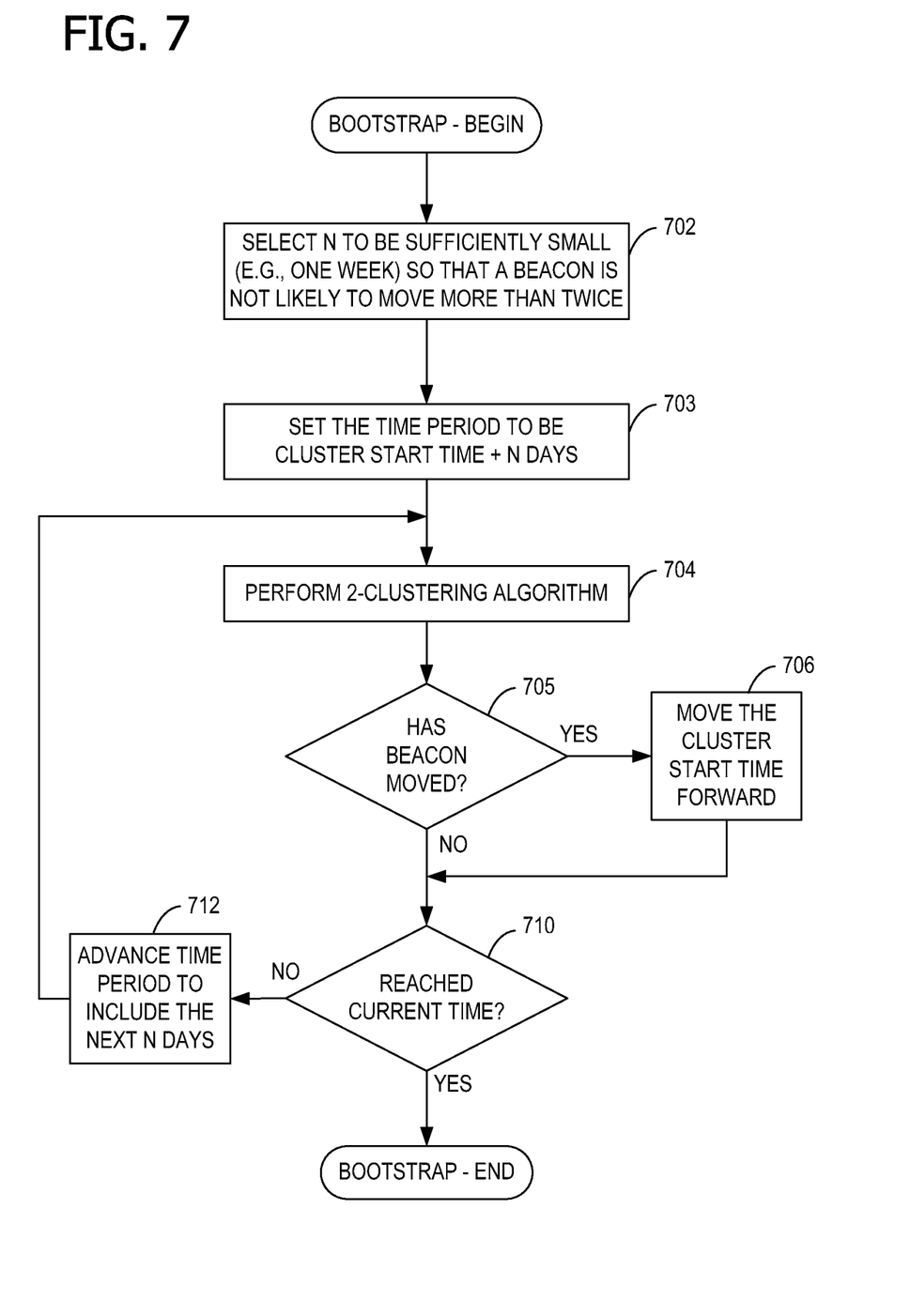
FIG. 7 is an exemplary flow chart illustrating operation of a bootstrap process to identify a single cluster of positioned observations for each beacon.

Referring next to FIG. 7, an exemplary flow chart illustrates operation of a bootstrap process to identify a single cluster of positioned observations 204 for each beacon 104. The bootstrap process is performed by the location service 106 and/or the computing device 302 to parse through a set of positioned observations 204 to identify a current location of the beacon 104. In general, the positioned observations 204 are divided into a plurality of time periods based on the associated timestamps 310. The location service 106 successively or iteratively advances through each of the time periods in sequence processing the positioned observations 204 having timestamps 310 therein (e.g., performing one or more of the operations illustrated in FIG. 4). By narrowing the range of positioned observations 204, the location service 106 attempts to simplify the clustering algorithm to a two-clustering analysis.

A value of N days is chosen at 702 (e.g., by the location service 106) such that the beacon 104 is not likely to have moved more than twice during the defined time period. A time period of N days is defined at 703 starting with the earliest observation date of the beacon 104 in the current cluster. In some embodiments, a refiner clock associated with the location service 106 is set based on the defined time period. This enables the clustering analysis to be simplified to a two-clustering analysis. The two-clustering analysis is performed at 704 using the positioned observations 204 having timestamps 310 within the defined time period.

At 705, if the two-clustering analysis determines that the beacon 104 has moved to a new location, the cluster start time 308 for the beacon 104 is moved forward at 706 to (e.g., or created to be) the time of the earliest timestamp 310 associated with a positioned observation 204 involving the beacon 104 at the new location.

If the current time has been reached at 710, the bootstrap process ends. Otherwise, the location service 106 advances the time period to include the next N days (e.g., the refiner clock advances to the next time period) at 712. If the cluster start time 308 was moved forward at 706, the time period is advanced to include the next N days (e.g., the moved cluster start time 308 plus N days). If the cluster start time 308 was not moved forward, the time period is still advanced by N (e.g., time period end time plus N).

In an example, if the initial cluster start time is t and N is 10, the initial time period covers t to t+10. After performing the two-clustering algorithm at 704, if the beacon did not move, then the time period is set to covert to t+20 in the next iteration of 704. However, if the beacon did move and the new beacon cluster start time is t+5, then the time period is set to cover t+5 to t+15 in the next iteration of 704. Alternatively, if the beacon did move, the time period may be set to cover t+5 to t+20 (e.g., advance the time period end time by N).

In this manner, another set of positioned observations 204 are then processed at 704.

In some embodiments, the time period is advanced at 712 to cover the next N days (e.g., to identify the positioned observations 204 associated with the next N days), where N is the same value as the previous N. In other embodiments, the value of N may change from time period to time period (e.g., the first time period may be a week, while the second time period or a subsequent time period may be a couple of days or a month). For example, the value of N may change based on the quantity of positioned observations 204 available and/or an error radius associated with a calculated position of the beacon 104 during the defined time period. In such embodiments, N is incremented at 712 by the new value of N.

The operations illustrated and described with reference to FIG. 7 apply the two-clustering analysis to positioned observations 204 selected incrementally over time until the current time is reached. In other embodiments, the k-means clustering algorithm such as shown in FIG. 5 is used to perform the bootstrapping function. In such embodiments, all the positioned observations 204 through the current time are input to the k-means clustering algorithm. The value of k is increased until the latest or current cluster is identified (e.g., operations 510, 512, 514, and 516 in FIG. 5 are performed).

Figure 8:
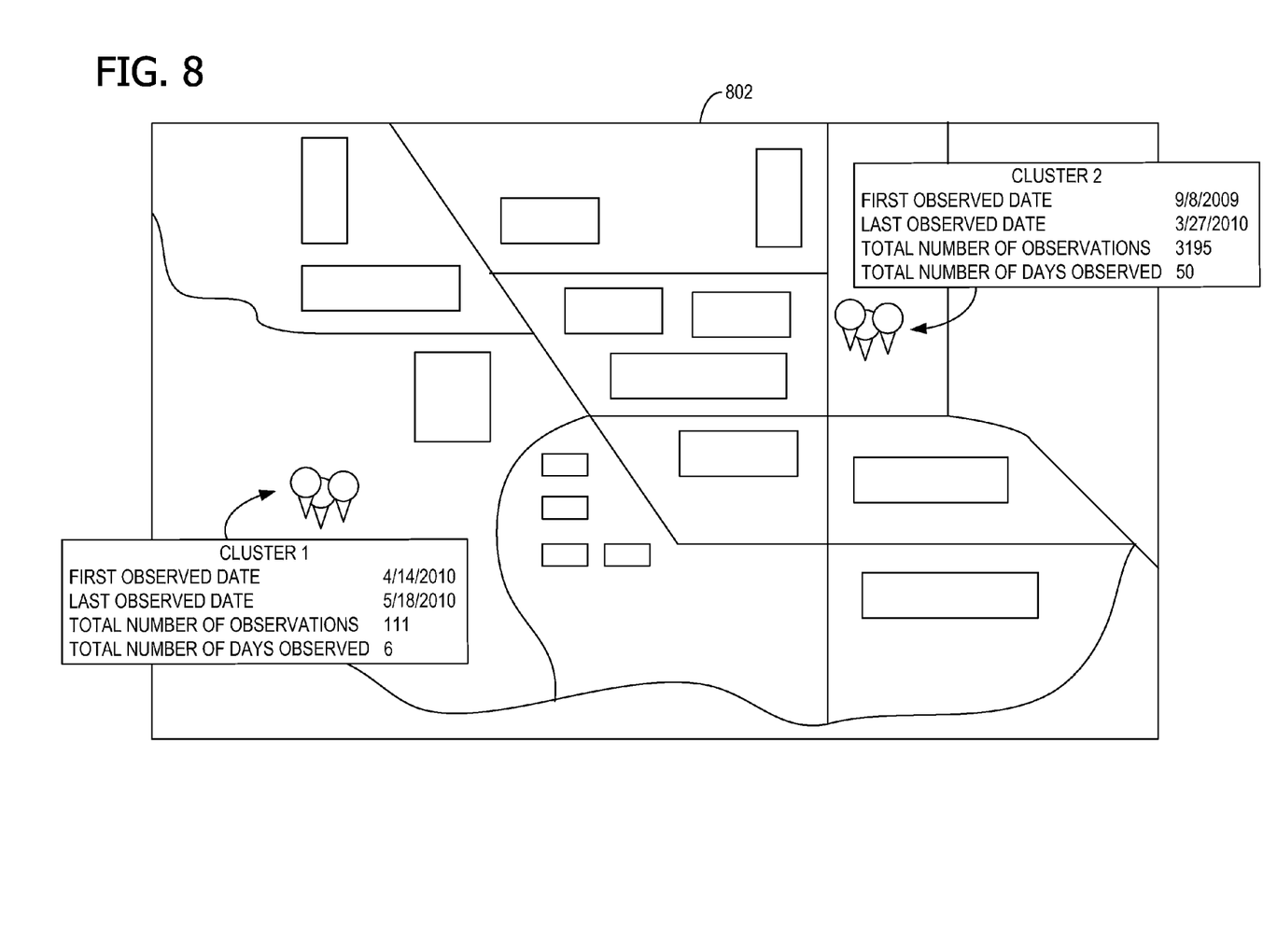
FIG. 8 is an exemplary map showing two clusters of positioned observations.

Referring next to FIG. 8, an exemplary block diagram illustrates a map 802 showing two clusters of positioned observations for a particular beacon. In this example, there are two clusters. In Cluster 1, the first observed date is Apr. 14, 2010, the last observed date is May 18, 2010, there are 111 observations associated with the beacon, and the beacon was observed for 6 days. In Cluster 2, the first observed date is Sep. 8, 2009, the last observed date is Mar. 27, 2010, there are 3195 observations associated with the beacon, and the beacon was observed for 50 days.

In the example of FIG. 8, the clustering algorithm identifies Cluster 1 and Cluster 2 as cohesive, mutually exclusive clusters because the timestamps associated with the observations do not overlap. As such, the result of applying the operations on FIG. 5 is that the beacon has moved once and is presently located at the position of Cluster 1 at least because Cluster 1 has the latest observations.

ADDITIONAL EXAMPLES

Some embodiments of the disclosure contemplate three-dimensional movement. For example, aspects of the disclosure operate to identify changes in elevation for a beacon 104 (e.g., the beacon 104 changed floors in an office building). In such embodiments, the position information is three-dimensional. For example, the position information includes not only latitude and longitude values, but also an elevation or altitude value.

At least a portion of the functionality of the various elements in FIG. 3 may be performed by other elements in FIG. 3, or an entity (e.g., processor, web service, server, application program, computing device, etc.) not shown in FIG. 3.

In some embodiments, the operations illustrated in FIG. 4 and/or FIG. 5 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Computer storage media exclude propagated data signals. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for using the cluster start time 308 to omit positioned observations 204 associated with one or more prior positions of the beacon 104 from a k-means clustering analysis to determine the revised position of the beacon 104, and exemplary means for performing a k-means clustering analysis using a selected subset of the positioned observations 204 to determine the position of the beacon 104 that has changed position at least two times.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for applying a clustering analysis to a subset of positioned observations to identify a change in at least an elevation of a beacon, said system comprising:
   a memory area associated with a computing device, said memory area storing a plurality of positioned observations for a beacon, each of said positioned observations having a timestamp and an altitude value associated therewith, said beacon having a cluster start time associated therewith; and
   a processor programmed to:
      select, from the memory area, one or more of the positioned observations having a timestamp later than or equal to the cluster start time;
      determine, for the beacon, a three dimensional position and associated error radius based on the selected positioned observations;
      compare the determined error radius with a pre-defined threshold radius; and
      based on the comparison, calculate a revised three-dimensional position for the beacon to identify a change in at least an elevation of the beacon by:
         grouping the selected positioned observations into a plurality of clusters based at least on the altitude values;
         selecting one of the plurality of clusters based on the timestamps; and
         determining the revised three-dimensional position for the beacon based on the positioned observations corresponding to the selected cluster.

2. The system of claim 1, wherein the processor is further programmed to:
   adjust, in the memory area, the cluster start time for the beacon based on an earliest timestamp associated with the positioned observations corresponding to the selected cluster; and
   remove from subsequent consideration the positioned observations having timestamps earlier than the adjusted cluster start time.

3. The system of claim 1, wherein the revised three-dimensional position for the beacon includes a revision to only the altitude value of the beacon.

4. The system of claim 1, wherein the processor is programmed to calculate the revised three-dimensional position if the determined error radius exceeds the pre-defined radius.

5. The system of claim 1, wherein the plurality of positioned observations comprise crowd-sourced records each identifying one or more beacons observed by one of a plurality of mobile computing devices.

6. The system of claim 1, wherein the error radius is based on a type or signal strength of the beacon.

7. The system of claim 1, wherein selecting one of the plurality of clusters based on the timestamps comprises selecting the cluster having a later initial observation time.

8. A method comprising:
   grouping, by a computing device, a plurality of positioned observations for a beacon into a plurality of clusters based on a spatial distance, each positioned observation having a timestamp associated therewith, each cluster having positioned observations within a timestamp range associated with the respective cluster;
   identifying, by a computing device, one of the plurality of clusters having a most recent timestamp;
   for clusters other than the one of the plurality of clusters, determining, by a computing device, whether the timestamp range associated with the one of the plurality of clusters overlaps with the timestamp ranges associated with the other clusters; and
   based on the determination, publishing a position associated with the one of the plurality of clusters as the position of the beacon.

9. The method of claim 8, wherein based on the determination that the timestamp range overlaps, the published position represents a most recent position of the beacon, and further comprising designating the beacon as a moving beacon.

10. The method of claim 8, wherein based on the determination that the timestamp range does not overlap, the published position represents a current position of the beacon, and further comprising designating the beacon as a moved beacon.

11. The method of claim 8, further comprising associating a threshold time with the beacon.

12. The method of claim 11, wherein one or more of the plurality of positioned observations are excluded, from being grouped into the plurality of clusters, based on the threshold time.

13. The method of claim 11, wherein each timestamp associated with the positioned observations is later than or equal to the threshold time.

14. The method of claim 8, wherein the plurality of positioned observations comprise crowd-sourced records each identifying one or more beacons observed by one of a plurality of computing devices.

15. The method of claim 8, wherein publishing the position comprises publishing a three-dimensional position of the beacon.

16. The method of claim 8, wherein the spatial distance is based on a type or signal strength of the beacon.

17. The method of claim 8, wherein said grouping, said identifying, and said determining are performed periodically.

18. A computing device comprising:
 a memory area storing a plurality of three-dimensional positioned observations for a beacon; and
 a processor configured to:
  select, from the plurality of three-dimensional positioned observations for the beacon, one or more of the three-dimensional positioned observations having a timestamp later than or equal to a threshold time associated with the beacon;
  group the selected three-dimensional positioned observations into a plurality of clusters based at least on a spatial distance;
  select one of the plurality of clusters based on the timestamps; and
  determine a revised three-dimensional position for the beacon based on the positioned observations corresponding to the selected cluster.

19. The computing device of claim 18, wherein the processor is further configured to:
 adjust the threshold time for the beacon based on an earliest timestamp associated with the positioned observations corresponding to the selected cluster; and
 remove from subsequent consideration the positioned observations having timestamps earlier than adjusted threshold time.

20. The computing device of claim 18, wherein the spatial distance includes elevation, and the revised three-dimensional position for the beacon includes a change in at least an altitude value for the beacon.

* * * * *